United States Patent
Smith et al.

(10) Patent No.: US 10,528,906 B2
(45) Date of Patent: Jan. 7, 2020

(54) SYSTEM AND METHOD FOR RESPONSIVE PROCESS MANAGEMENT DRIVEN BY BUSINESS VISIBILITY AND COMPLEX EVENT PROCESSING

(75) Inventors: Daniel D. Smith, San Jose, CA (US); Prashant Thumma, Londonderry, NH (US); Sheldon Borkin, Natick, MA (US); John Bates, Nashua, NH (US); Ayyappan Ponnan, Tamil Nadu (IN); Subhash K. Namboodiri, Mumbai (IN); Phanendra Babu Garimella, Sunnyvale, CA (US); Jean-Francois Cloutier, Laval (CA); Murali Mohan, Hyderabad (IN); Mohammad Ali Ketabchi, Redwood City, CA (US)

(73) Assignee: PROGRESS SOFTWARE CORPORATION, Bedford, MA (US)

( * ) Notice: Subject to any disclaimer, the term of this patent is extended or adjusted under 35 U.S.C. 154(b) by 200 days.

(21) Appl. No.: 13/448,998

(22) Filed: Apr. 17, 2012

(65) Prior Publication Data
US 2013/0018702 A1   Jan. 17, 2013

Related U.S. Application Data

(60) Provisional application No. 61/478,454, filed on Apr. 22, 2011.

(51) Int. Cl.
*G06Q 10/00*     (2012.01)
*G06Q 10/06*     (2012.01)

(52) U.S. Cl.
CPC .......... *G06Q 10/067* (2013.01); *G06Q 10/06* (2013.01); *G06Q 10/063* (2013.01)

(58) Field of Classification Search
CPC ................. G06Q 10/06; G06Q 10/063; G06Q 10/063114; G06Q 10/06316; G06Q 10/067; G06Q 10/0633
See application file for complete search history.

(56) References Cited

U.S. PATENT DOCUMENTS

2002/0038228 A1* 3/2002 Waldorf ................. G06Q 10/06
                                                          705/7.37
2003/0181991 A1* 9/2003 Chau et al. ...................... 700/1
(Continued)

OTHER PUBLICATIONS

Chiu, Dickson K.w., et al. "Workflow View Driven Cross-Organizational Interoperability in a Web Service Environment." Information Technology and Management, vol. 5, No. 3/4, 2004, pp. 221-250. (Year: 2004).*

(Continued)

*Primary Examiner* — William S Brockington, III
(74) *Attorney, Agent, or Firm* — Patent Law Works LLP

(57) ABSTRACT

A business process management (BPM) system, a business event processing system, and a business visibility system are integrated into a responsive process management platform using standardized messages to permit communication and collaboration among the systems. The BPM system has the capability to model and execute at least one monitoring process including at least one monitoring workstep. This monitoring process makes visible in the BPM system processes of interest that are executing in external systems. The business event processing system and/or the business visibility system have tools to allow users to easily configure those systems to sense events and send appropriate standardized messages to the other systems, can extract and send data to the BPM system, and can send alerts to the BPM system.

26 Claims, 6 Drawing Sheets

(56) References Cited

U.S. PATENT DOCUMENTS

| | | |
|---|---|---|
| 2005/0044197 A1* | 2/2005 | Lai .................................. 709/223 |
| 2006/0259289 A1* | 11/2006 | Shia ................................ 703/12 |
| 2007/0288791 A1* | 12/2007 | Allen et al. ........................ 714/4 |
| 2008/0086345 A1* | 4/2008 | Wilson .................. G06Q 10/063 705/7.11 |
| 2008/0209078 A1* | 8/2008 | Bates et al. ..................... 710/10 |
| 2009/0125635 A1* | 5/2009 | Barga et al. .................. 709/231 |
| 2009/0144694 A1* | 6/2009 | Lin et al. ...................... 717/102 |
| 2009/0271468 A1* | 10/2009 | DiStefano ..................... 709/201 |
| 2010/0114629 A1* | 5/2010 | Adler et al. ....................... 705/7 |
| 2010/0332640 A1* | 12/2010 | Goodrow ............ H04L 41/0856 709/223 |
| 2012/0016678 A1* | 1/2012 | Gruber et al. ................ 704/275 |

OTHER PUBLICATIONS

Klingemann, J., et al. "Deriving service models in cross-Organizational workflows." Proceedings Ninth International Workshop on Research Issues on Data Engineering: Information Technology for Virtual Enterprises. RIDE-VE '99, 1999. (Year: 1999).*
Schulz, Karsten A., and Maria E. Orlowska. "Facilitating cross-Organisational workflows with a workflow view approach." Data & Knowledge Engineering, vol. 51, No. 1, 2004, pp. 109-147. (Year: 2004).*

\* cited by examiner

300

Message Header 310

| Event Element | JMS Property name | Data type | Mandatory |
|---|---|---|---|
| External Instance Id | EXTERNAL_INSTANCE_ID | String | Yes |
| Process Name | PROCESS_NAME | String | Yes |
| Workstep Name | WORKSTEP_NAME | String | Yes |
| Operation Type | OPERATION_TYPE | String | Yes |
| Instance Alias | INSTANCE_ALIAS | String | No |
| Email Id | NOTIFY_EMAILS | String | No |

Message payload 320

| Event Element | Key | Data type | Mandatory |
|---|---|---|---|
| Sender | SENDER | String | Yes |
| Category | CATEGORY | String | No |
| Priority | PRIORITY | String | No |
| Performer | PERFORMER | String | No |
| Loop counter | LOOP_COUNTER | Integer | No |
| Create Time | CREATE_TIME | Long | Yes |
| Start Time | START_TIME | Long | No |
| End Time | END_TIME | Long | No |
| Duration | DURATION | Long | No |
| Context | CONTEXT | *HashMap* | No |
| Dataslot | DATASLOT | *HashMap* | No |

Message Structure 330

| Property | Value | Type |
|---|---|---|
| ALERT_NAME | The alert name | String |
| APPLICATION_NAME | The alert application name | String |
| ALERT_MESSAGE | The alert message | String |
| ALERT_SEVERITY | The alert severity value | String |
| ALERT_RECIPIENT | The list of recipients | List |

FIG. 3

SYSTEM AND METHOD FOR RESPONSIVE PROCESS MANAGEMENT DRIVEN BY BUSINESS VISIBILITY AND COMPLEX EVENT PROCESSING

This application claims priority to provisional application Ser. No. 61/478,454, filed Apr. 22, 2011.

FIELD OF THE DISCLOSURE

This disclosure relates to a system and method of providing automated, real-time interaction among enterprise business infrastructure systems, such as a business visibility system, a business event processing system, and a business process management system, and of enabling these systems to provide business process management monitoring and related capabilities for business processes executing in systems external to those aforementioned.

BACKGROUND

Business infrastructure software often includes one or more separate components. For example, Progress Software Corporation of Bedford, Mass. provides a business visibility system, known as Actional. Business visibility software provides, among other functions, the ability to dynamically discover services deployed throughout the topology of an enterprise business services infrastructure. Business visibility software may, for example, provide access to events from legacy accounting or other systems. Progress Software Corporation also provides a business event processing system, known as Apama, which allows complex business events to be analyzed and patterns to be detected. Progress Software Corporation further provides a business process management system, known as Savvion, which allows for business process visibility, analysis, modeling and execution.

Although existing business infrastructure support software components have some relationships to each other, they often arise from distinct legacy systems, are not integrated into a unified system, and lack effective mechanisms for interacting and communicating. Attempts to permit these components to communicate with each other involve the use of complex and custom "glue" code that is difficult to revise or apply to new business processes or platforms.

Business process management systems provide numerous capabilities for the monitoring of business processes which are modeled and executed within the business process management system. Such capabilities include for example analysis tools for the measurement and display of metrics with respect to the status of the processes, times to execute worksteps in the processes, and bottlenecks in the processes. These capabilities are not available from the business process management system for business processes which execute in systems external to the business process management system.

SUMMARY

An aspect of the present invention includes a responsive process management platform, comprised of a business visibility system, a business event processing system, and a business process management system. Standardized messages permit communication and collaboration among the business visibility system, the business event processing platform, and the business process management system. The responsive management platform may additionally include other components such as a common user interface portal, a common data analysis system, and a common data repository.

In another aspect, a business process management (BPM) system has the capability to model and execute at least one monitoring process including at least one monitoring workstep. This monitoring process makes visible in the BPM system processes of interest that are executing in external systems. The BPM system can use its analysis tools to monitor the external systems and the BPM system can focus on the details of interest. In yet a further aspect, the BPM system has the capability to model and execute at least one monitoring process which also includes conventional BPM worksteps.

In yet another aspect, the RPM platform allows for the leveraging of a business visibility (BV) system with a BPM system. The business visibility system can initiate a conventional BPM process or a monitoring BPM process. If the business visibility system initiates a monitoring process, the BV system can advance worksteps in the business process after sensing when worksteps start and complete. Additionally, the BV system may have tools to allow users to easily configure the BV system to sense such events and to send appropriate standardized messages to business event processing (BEP) and BPM systems.

In a further aspect, the RPM platform allows for the leveraging of a BEP system with a BPM system. The business event processing system may obtain external events plus events from a business visibility system to identify events that should initiate a process or advance a workstep in a process. The BEP system can initiate a conventional BPM process or a monitoring BPM process. If the business event processing system initiates a monitoring process, the BEP system can advance worksteps in the business process after sensing when worksteps start and complete. Additionally, the BEP system may have tools to allow users to configure the BEP to sense such events and to send appropriate standardized messages to the BPM system.

In a further aspect, the business visibility system can extract and send data to the BPM system.

In a further aspect, the business event processing system can extract and send data to the BPM system.

In a further aspect, either or both of the BV and BEP systems can send alerts to the BPM system signifying an exception condition which requires a response managed by the BPM system. This could, for example, initiate a new exception process instance or could notify a person through the BPM system user interface to investigate the condition.

Another aspect of the present invention includes a BPM system that includes monitoring processes that use a set of standardized messages to monitor processes executing on external systems. In some embodiments of this aspect, the standardized messages include an external instance ID that uniquely identifies a target instance. In some embodiments of this aspect, the BPM system has the capability to model and execute at least one monitoring process which also includes conventional BPM worksteps that execute internally to the BPM system. In some embodiments of this aspect, the BPM system is configured to permit the holding of messages for sequential execution of worksteps within the monitoring process that are received out of order, and subsequent processing of the messages in the proper order.

Another aspect of the present invention includes a graphical user interface in the BPM system that provides a set of icons representing monitoring worksteps of multiple types in processes executing on external systems as well as icons representing worksteps that execute internally to the BPM system.

Another aspect of the present invention includes a responsive process management platform, comprised of a business visibility system and a business process management system, wherein the platform may or may not include a BEP system. Standardized messages permit the business visibility system to initiate at the business process management system monitor processes having worksteps executing externally to the business process management system and having worksteps that execute internally to the business process management system.

Another aspect of the present invention includes a responsive process management platform, comprised of a business event processing system and a business process management system, wherein the platform may or may not include a BV system. Standardized messages permit the business event processing system to initiate at the business process management system monitoring processes having worksteps executing externally to the business process management system and having worksteps that execute internally to the business process management system.

BRIEF DESCRIPTION OF THE DRAWINGS

FIG. 3 shows exemplary message structures used in a responsive process management platform.

DETAILED DESCRIPTION

A responsive process management (RPM) platform allows enterprises to have real-time visibility of their business processes (executing both within and external to the platform), model their business processes, execute those models, sense and respond to external events, and incrementally improve those processes. An RPM platform can be used to model many types of business processes, such as loan applications and servicing, airline operations management, or fraud detection for an ATM network.

Figure 1:
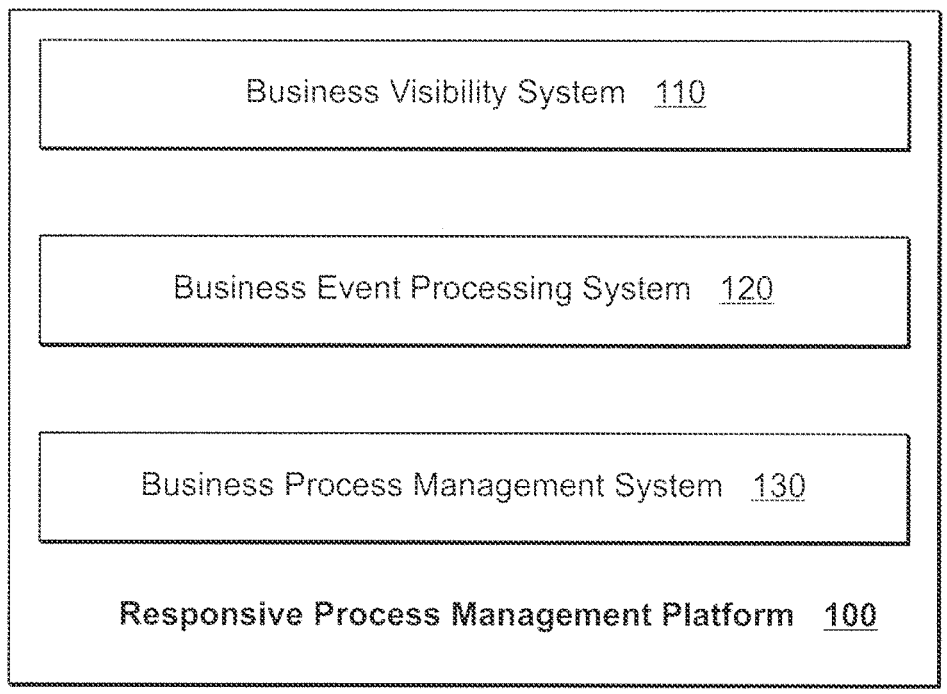
FIG. 1 shows a responsive process management platform and its component systems.

A typical RPM platform 100 includes a real-time business visibility (BV) system 110, a business event processing (BEP) system 120, and a business process management (BPM) system 130, as shown in FIG. 1. Real-time business visibility provides a business with the ability to see and know how its business systems infrastructure is operating, providing answers to questions such as where are the bottlenecks, where are processes getting stuck, and what is causing problems in the business systems infrastructure. The BEP system allows the business to respond to external and internal events to sense threats and opportunities and also to predict future trends and events, such as predicting the breach of a service level agreement. The BPM system provides for business process improvement through the monitoring, analysis, modeling, and execution of business processes.

The RPM platform includes the ability to model operational enterprise business processes as they interact with enterprise applications, systems and services. These monitoring processes model operational processes in order to formalize, monitor and improve business operations in near real-time. The business process management (BPM) system has the capability to model and execute at least one monitoring process including at least one monitoring workstep. This monitoring process makes visible in the BPM system processes of interest that are executing in external systems. The BPM system can use its analysis tools to monitor the external systems and the BPM system can focus on the details of interest. The BPM system has the capability to model and execute at least one monitoring process which also includes conventional BPM worksteps—this is sometimes called a "hybrid process."

Through an RPM platform, the business visibility platform can dynamically discover, monitor, and apply policies to business process elements in the enterprise business service infrastructure. These policies can monitor numerous items including performance, and the state and advancement of the business processes. The RPM platform also can be used to leverage the ability of the business event processing system to analyze streams of complex events. Complex event streams can be channeled into the business event processing platform for processing and analysis, with the results integrated into the executing business process.

The RPM platform also provides synergy between the business visibility system and the business event processing system. The business visibility system can derive business data or information of a specific type (sometimes called content-derived dimensional data) via interceptors that monitor the actual business processes. This data then can be obtained from the business visibility system by the business event processing system. For example, a stock trading process can be monitored by the business visibility platform. If the process appears to be running too slowly, the business visibility system can send the appropriate dimensional data to the business event processing system. The business event processing system can look at the volume level of trades and, if the volume is high, generate an alert related to the slow performance. If the volume is low, however, the system may take no action as the slow operation will not have a significant business impact. In this way, the business event processing system can be used to analyze content-derived dimensional data.

Dimensional data also can be used as part of a monitoring process. For example, a monitoring process could be created to observe the on-boarding of a customer in connection with a trading application. Once on-boarded, the underlying business system can allow the customer to make appropriate trades. For example, two separate human actors or processes might be utilized in the on-boarding process, one to obtain credit card information and one to obtain other trading-related information. The business event processing system in this example is instructed to wait for both steps to be complete, regardless of the order in which they arrive. Once both of these steps have been completed, the business event processing system concludes that on-boarding is complete and advances the workstep in the monitoring process to reflect that the customer was successfully on-boarded. Similarly, the business event processing system can source events in the business visibility system. Through this communication, the business event processing system and business visibility system can cooperate to detect anomalous, problematic, or otherwise interesting patterns.

The RPM platform also enables the business visibility platform and the business event processing system to collaborate in creating, operating on, and driving monitoring processes. For example, either system can create a monitoring process instance that the other system can operate upon by directly driving the process and by updating its data values. Through this cooperation between the business visibility system and the business event processing system, external processes are capable of generating events and driving the monitoring processes. In some embodiments, the cooperation is enabled by use of the messaging structure shown in FIG. 3, as described below.

Event Processing Architecture

Figure 2:
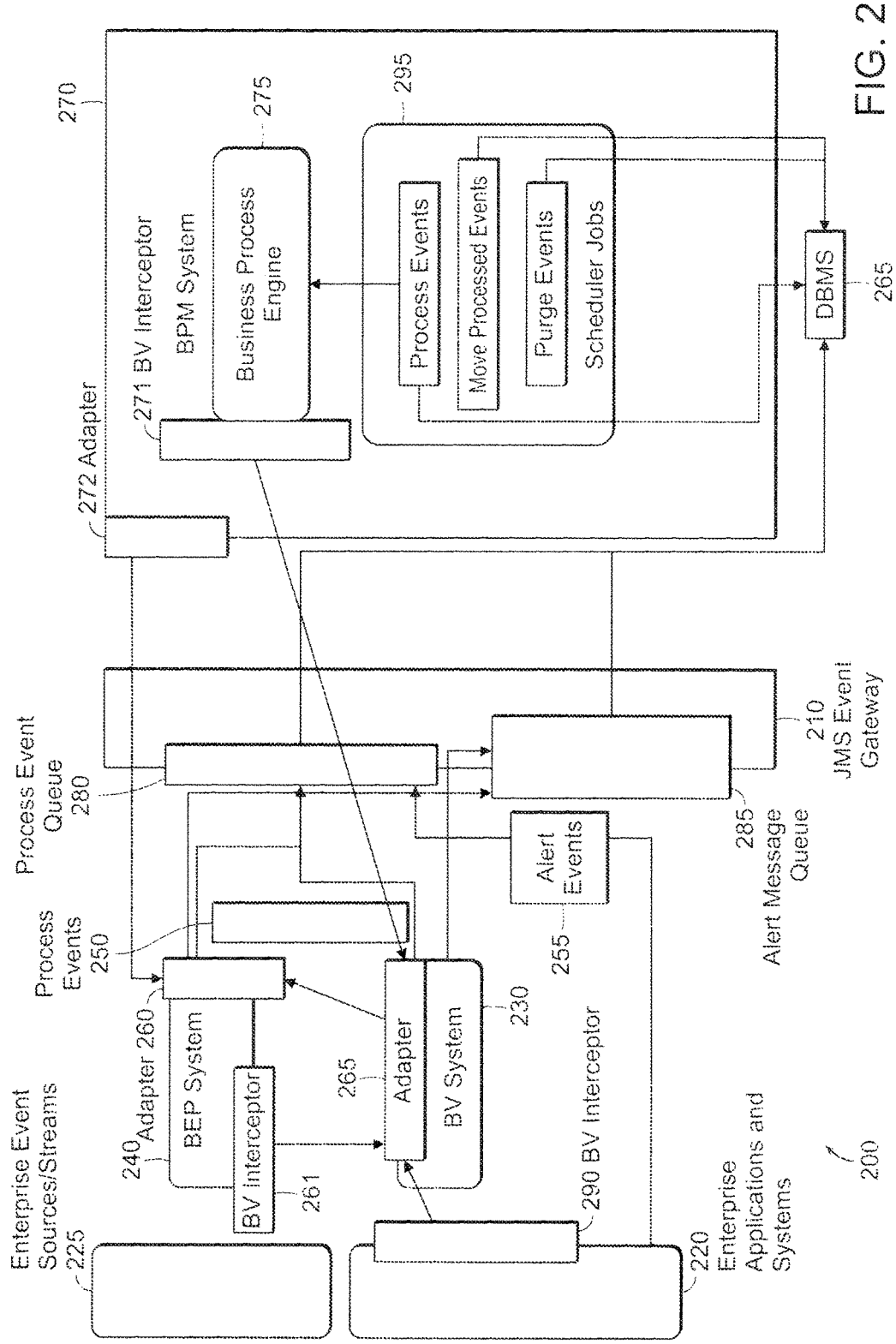
FIG. 2 shows an exemplary event processing architecture, in accordance with an aspect of the present invention.

An exemplary event-processing architecture is shown in FIG. 2. External process event gateway 210 receives process events 250 from external processes, such as Applications and Systems 220, business visibility system 230 and business event processing system 240. It also receives alert events 255 from Applications and Systems 220, business visibility system 230 and business event processing system 240. External process event gateway 210 also understands operational messages 300, which enable external processes to carry out operations on monitoring processes and conventional processes. Operational messages 300 are passed between components of the RPM platform in order to facilitate their cooperation. These operational messages 300, as shown in FIG. 3, are further explained below. In some embodiments, these messages are provided in accordance with the Java Message Service API (JMS), although other messaging systems or application programming interfaces (APIs) such as Web Services APIs or Java remote procedure APIs could be used. Operational messages 300 can carry updates derived from the state of an external process to control the flow of a monitoring process. Additionally, operational messages 300 can update the data values of a monitoring process independently. The monitoring processes can respond to these operational messages similar to traditional worksteps. Through cooperation between external process event gateway 210 and monitoring processes, external processes 220-240 can instantiate a process instance for monitoring and conventional processes, activate a process step (also referred to as a workstep) for monitoring processes, and complete the process step for monitoring processes within the BPM system.

Figure 5:
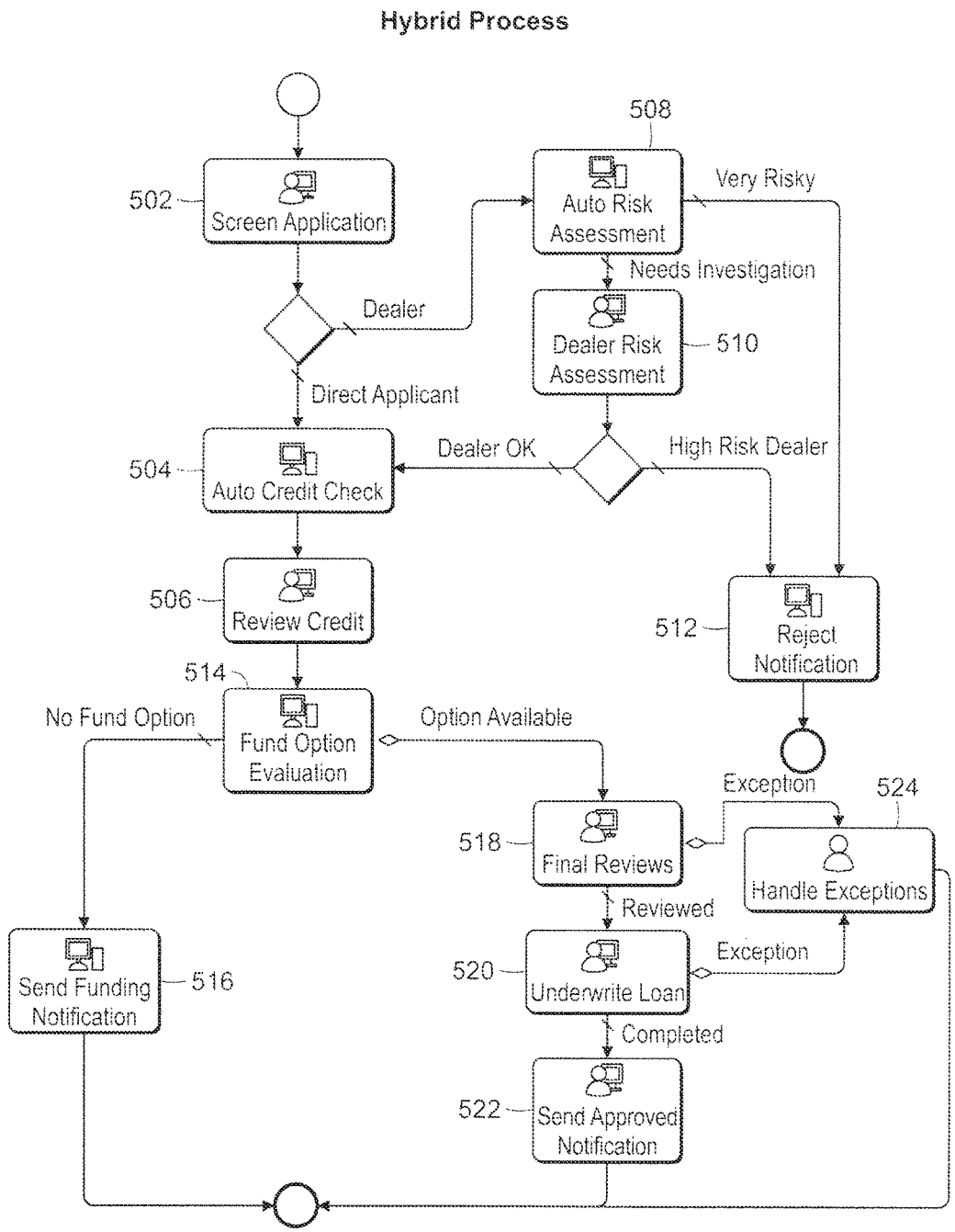
FIG. 5 shows a portion of an exemplary user interface representing a hybrid process.

An exemplary structure of the operational messages 300 is shown in FIG. 3. Item 310 depicts an embodiment of the event elements contained in the header of an operational message 300. These event elements include external instance ID, process name, work-step name, operation type, instance alias, and email ID. External instance ID uniquely identifies external process application instances, such as process flows executing through Applications and Systems 220, business visibility platform 230 and business event processing system 240. This external instance identifier helps to identify the relationship between externally executing process flows and the corresponding monitoring process instances in the RPM system. Typically, the external instance ID is a mandatory element in every operational message. An independent subprocess of a process can have its own external instance ID. Process name is a human-readable string for identifying the process, such as "Loan Application Process." The work step name is a string that identifies the workstep acting or being acted upon by the operational message 300, and typically is not used when initiating a new process instance. The workstep name could take a form like "Credit Check," as shown in FIG. 5. Operation type specifies the operation to be performed. In some embodiments, the operation type can have values for creating an instance, activating a workstep, completing a workstep, and updating a dataslot. The instance alias is a human-readable description of the current instance, such as "Loan Application Credit Check," and Email ID is an email address to which notifications should be sent about invalid messages. In some embodiments, all of the event elements contained in message header 310 are mandatory (that is, the field must have a valid value), with the exception of instance alias and email ID.

Item 320 depicts the event elements contained in an embodiment of the payload of an operational message 300. These event elements include sender, category, priority, performer, loop counter, create time, start time, end time, duration, context and dataslot. Sender identifies the originator of the operational message 300. The sender could be, for example, the business visibility platform. Category defines grouping of the external events into functional groups and is specified by the sender. For example, all events sent from a financial application might have a category specified as "Finance." The category can be used to analyze event processing performance and filter events in case of any event processing problems. The priority event element is used to prioritize one workstep over another. Priority does not refer to the priority of the operational message 300, but instead refers to the priority of the underlying data contained in the process referenced by the external instance ID. For example, priority could be set to "high" for any loan amount requested over $500,000, and "low" for any loan amount requested under $10,000. Performer identifies the entity performing the workstep, such as "Customer Service Representative" or "CRM System," for example. That is, the performer may correspond with a person or an automated process. Loop counter identifies the sequence number of the iterations performed in one process step or workstep. Events with a loop counter value will update the appropriate iteration of the process step or workstep. This helps in obtaining audit reports across all executions of a workstep. For example, a "Review" step might get executed three times if there are three reviewers who will review a document. In this case, there will be three events each having a distinct loop counter value (1, 2, 3). The loop counter also can be used in ordering messages which have been received out-of-order of the underlying process events, as discussed below. The create time event element identifies when the operational message was created in the external system. Start time and end time, similarly, identify when the task associated to the process step or workstep was started and completed in the external system. The duration event element identifies how long the workstep took to complete, and accounts for pauses in the system or other situations where the duration should not be incremented due to the current workstep being forced to wait on other components in the system. The context event element can contain any data related to the specific process being modeled. For the example of a loan application, it could represent the dollar amount of the loan. Finally, the dataslot event element allows for the storing and updating of multiple data items related to the underlying process. With a loan, the dataslot information may include business data such the borrower's name, home address, credit score, work location, and the like. In some embodiments of the event elements contained in the payload of an operational message, only sender and create time are mandatory.

Both of the BV and BEP systems can send alerts 255 to the BPM system signifying an exception condition which requires a response managed by the BPM system. This could, for example, initiate a new exception process instance or could notify a person through the BPM system user interface to investigate the condition. The alert event message in one embodiment is sent as a JMS message from BV system 230 or BEP system 240 to the AlertMessageQueue 285. An embodiment of an alert message 330 is shown in FIG. 3. Alert message 330 includes as elements alert name, application name, alert message, alert severity, and alert recipient. Alert name is a string describing the type of the alert such a "Performance Alert." Application name is a string describing the name of the application issuing the alert such as "Actional." Alert message is the information to be conveyed to the person or system processing the message such as "The trading system is processing transactions at a speed 25% worse than the SLA." Alert severity is a string indicating the severity of the alert such as "Urgent." Alert recipient is a list of RPM users or systems who are to receive the alert. These messages are sent by the BEP system from adapter 260 to AlertMessageQueue 285, and by the BV system from adapter 265 to AlertMessageQueue 285. In one embodiment the alert messages are read from AlertMessageQueue 285 and stored in database 265. Subsequently they are processed by the Event Processor 295 in BPM system 270 and then provided to the Business Process Engine 275 for processing and display. In another embodiment the alert messages are read from AlertMessageQueue 285 by a responsive process management portal for processing and display.

In part because some parts of the RPM platform can be widely distributed, some messages may be received out of sequence. In some embodiments, the RPM platform incorporates the ability to handle out-of-sequence events. When an event is received out of sequence, the BPM system stores the event until the appropriate place in the event sequence is reached. Once the event is ready to be acted upon in the appropriate order, processing continues. The BPM system supports, for example, events received before a workstep is ready, events received after a workstep is ready, a workstep event received before an instance is created, or a dataslot update event received before an instance is created. As noted above, the message loop counter can be used in ordering messages which have been received out-of-order of the underlying process events.

Figure 4:
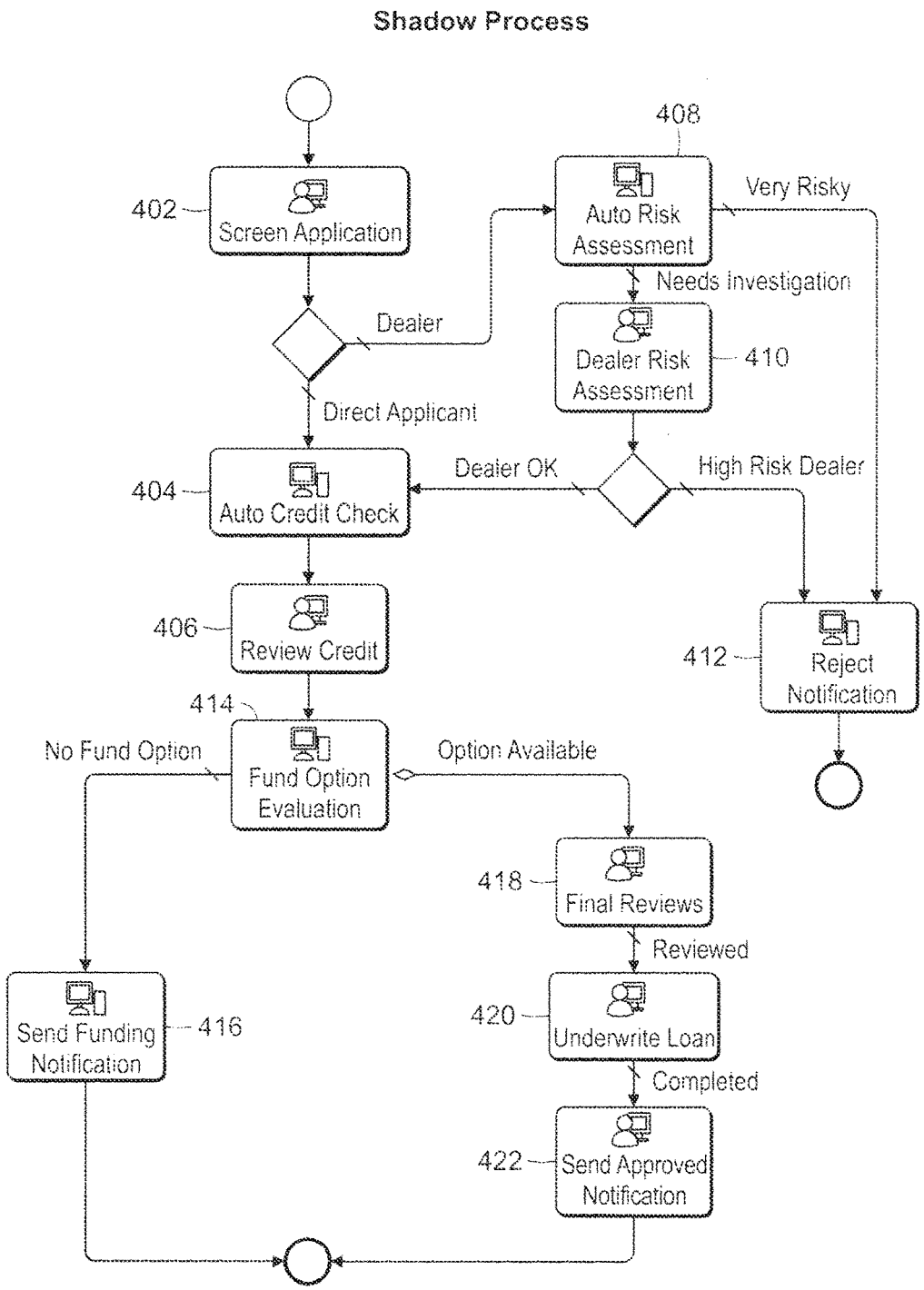
FIG. 4 shows a portion of an exemplary user interface representing monitoring processes.

The business process monitoring system provides a user interface to model the monitoring processes. The standard user interface for the BPM system is enhanced with icons representing worksteps for monitoring processes. These worksteps are of various types, for example representing an external workstep performed fully by a system or representing an external workstep performed by a person interacting with a system. Within the BPM system, monitoring process worksteps are capable of responding to different types of events, such as creation of an instance, activation of a workstep, completion of a workstep, or the updating of a dataslot. FIG. 4, for example, shows a complete process created in the user interface. In order to create a monitoring process within the user interface, the user creates a process and then drags onto a representation of the process an icon representing the person or system that is responsible for performing a workstep in an external system. This provides the user with the ability to have processes monitoring external systems without actually executing the workstep within the BPM. A hybrid process as represented by an exemplary user interface is shown in FIG. 5.

In order to drive the monitoring processes, the business visibility platform utilizes a policy authoring framework to define events of interest. The policy authoring framework allows policies to be authored, such as Service Level Agreements (SLAs), which can be applied to the enterprise business infrastructure elements that have been discovered by the business visibility platform 230. Policies, such as SLAs, have three primary components: conditions, actions, and targets.

Policies are constructed to be triggered under a wide variety of configurable circumstances, or conditions. Conditions are derived from the state of the business infrastructure elements when services are invoked, messages are enqueued or dequeued, queries are made within the system, and the like. For example, in a loan servicing application, a transactional service can trigger a condition when an application is transmitted for approval. These conditions also have the ability to incorporate user-defined, content-derived dimensional data from the underlying systems. Such dimensional data can include the geographical region from which the request or message originates, customer classification data such as Platinum or Gold membership level, size of an order, or the like.

Policies also employ an array of configurable policy actions. Policy actions perform a task or variety of tasks in response to a condition being triggered. For example, policy actions can include informing a human or machine agent as to the state of the business infrastructure element that triggered the policy through an alert email, SMS, or other such notification. The action can also modify the state of the enterprise business service infrastructure that triggered the policy. In addition, custom conditions and actions can be easily created and utilized through an extensible policy authoring framework. For example, a condition and action could involve a rule monitoring people purchasing airline tickets who are identified as being on a terrorist watch list, and then triggering an appropriate action when such a person is identified.

Once the conditions and policy actions are defined, the policy is applied to targets, such as databases, application servers, messaging servers and the like. In some embodiments, the business visibility platform 230 discovers and monitors the enterprise business infrastructure elements in a non-intrusive manner, using some or all of business visibility interceptors 290 for external systems, business visibility interceptors 261 for BEP system, and business visibility interceptors 271 for BPM system, thereby requiring no modification of the underlying enterprise business infrastructure elements with special code. The components of the enterprise business infrastructure elements, such as services, operations, messaging queues, queries to databases and the like are made available graphically to the policy authoring framework for selection as targets. These targets can be fine grained, such as individual enterprise business infrastructure elements, or more coarsely grained, such as groups of similar or redundantly deployed elements. Targets can also consist of a hierarchical grouping of such elements, for example, elements grouped by network name patterns, co-location, or geographical region. This allows grouping with whatever level of granularity is desired.

By utilizing the policy authoring framework, external process event gateway 210 and a messaging abstraction layer component 265 of the business visibility platform, policy actions may drive elements of the RPM models directly. These policy actions can subsequently be configured to instantiate or operate on existing monitoring process instances in the BPM, in accordance with the event processing architecture 200 shown in FIG. 2. When a condition is met, a message identifying this triggering is automatically sent to the target. Within the RPM, these policy actions can create operational messages 300 destined for the external process event gateway 210 in order to target one of the monitoring process or conventional process operations. Additionally the messages can target the BEP adapter gateway 260 to send event information to the BEP system. Each operational message 300 can be populated with dimensional data values derived from the state of the monitored enterprise business infrastructure element that triggered the policy action in question. For example, if a monitoring process is monitoring a process for loan applications, a customer or agent may change the amount of the loan. The monitoring process monitoring the loan process is then updated to reflect this change. In the case of newly created process instances, these values are used to initialize the monitoring process data. For an existing instance, these values are used to update the process data.

As described, the policy authoring framework selects appropriate targets from the monitored enterprise business infrastructure elements and associates one or more policy actions. Once the business visibility platform 230 evaluates the condition and triggers the policy action, an operational message 300 is created and populated with the appropriate header information 310 and payload information 320. The business visibility platform 230 utilizes the message abstraction layer 265 to convey the message to the external process event gateway 210 of the RPM. This allows enterprise business infrastructure elements to be utilized through the business visibility platform 230 as targets of policies and to trigger conditions that drive monitoring process elements directly. Such events of interest are therefore capable of being defined for the business visibility system 230 to drive monitoring process elements without requiring modification to the enterprise business infrastructure elements themselves.

The business event processing platform 240 also can compose and dispatch operational messages 300 through the external process event gateway 210. The BEP receives event data optionally from each of external sources 225, BV system 230, and BPM system 270. Event processing rules and correlation logic to process diverse, high volume operational data and to detect the conditions or patterns of interest are defined in business event processing system 240. This can be accomplished, for example, either by a user-written application defining patterns of interest in an event processing language, or by use of an event modeling tool similar to the user interface described above. Such tooling allows for modeling and optimizing of events of interest within the business event processing system 240 in a graphical manner. When business event processing system 240 detects a condition or pattern of interest, the business event of interest is derived from the state of the logic and the operational data. These events are then processed by the business event processing system 240 in accordance with defined policies and sent through adapter 260 to the event gateway 210 and specifically to Process Event Queue 280 or to AlertMessageQueue 285 according to whether the message is a process message or an alert message. In some embodiments, the event processing logic of business event processing system 240 instantiates and interacts with monitoring processes and conventional processes. Events of interest, or business events derived therefrom, can be mapped to operations on the processes defined in the BPM to instantiate a process instance, activate a process task, complete a process task, or update the process data either as part of the aforementioned operations or as a discrete operation unto itself.

Further, authoring tooling in BEP system 240 allows the easy creation of event definitions corresponding to the operational messages 300 including event attributes for all of the elements of message 300. These event definitions can then be used in the event programming language and in the graphical tools.

Business visibility interceptor 261 is triggered when a business event or events of interest are detected according to policies managed by business visibility system 240. This allows business visibility system 240 to have a unified view of all business systems components both those within the RPM platform and those external applications and systems 220.

Further, the system described enables many enterprise business infrastructure elements to channel events to the business event processing system 240 by means of a new policy action integrated into the policy authoring framework of business visibility system 230. This policy action can craft a transactional event message directed to adapter 265, similar to operational messages 300. This message is dispatched to the adapter 260 of business event processing system 240, and can be configured to include dimensional data and data derived from the state of the enterprise business infrastructure elements that trigger the condition in question. The business event processing system 240 can then correlate the information in the transactional event message with other events to identify events of interest for further processing including transmission of operational messages to BPM system 270.

The above-described event processing architecture enables collaboration in driving monitoring and conventional processes by the business visibility system 230 and the business event processing system 240. This can be accomplished in different ways, depending on the configuration of policies and rules in business visibility system 230 and business event processing system 240.

The collaboration between the business event processing system 240 and business visibility system 230 is bidirectional. As previously described, the RPM platform can process and analyze high volume operation data by leveraging the capabilities of business event processing system 240 within a process, and by leveraging the business visibility platform 230 to provide a view of the business process elements as integral parts of the enterprise business infrastructure.

Business visibility interceptor 271 is triggered when a business event or events of interest are detected according to policies managed by business visibility system 240. This allows business visibility system 240 to have a unified view of all business systems components, both those within the RPM platform and those external applications and systems 220.

Further, BPM system 270 can send event messages to BEP system 240 by sending a message from adapter 272 to adapter 260, which could be done by a variety of means with messages similar to 300. This allows the rules and applications in 240 to make use of events and data from the processes in 270.

A hybrid process is illustrated in FIG. 5. As can be seen in Item 524, a monitoring process can handle exceptions in a manner that involves action by real world, human actors, making it a hybrid process.

Loan Application Monitoring and Hybrid Process Example

An embodiment of the present invention can be explained by means of an exemplary implementation. A loan processing company, for example, may have loans processed through a streamlined implicit operational process that uses a complex set of integrated enterprise applications and systems. Such an operational process is shown in FIG. 6.

These applications and systems are distributed across various collaborating partners such as fund processors, and service providers such as credit bureaus. Some difficulties with such a complex loan processing application include the lack of real-time visibility into how loans are getting processed, lack of information regarding at which state they currently exist, and difficulty in identifying proactively if there any exceptions to the loan application process.

Figure 6:
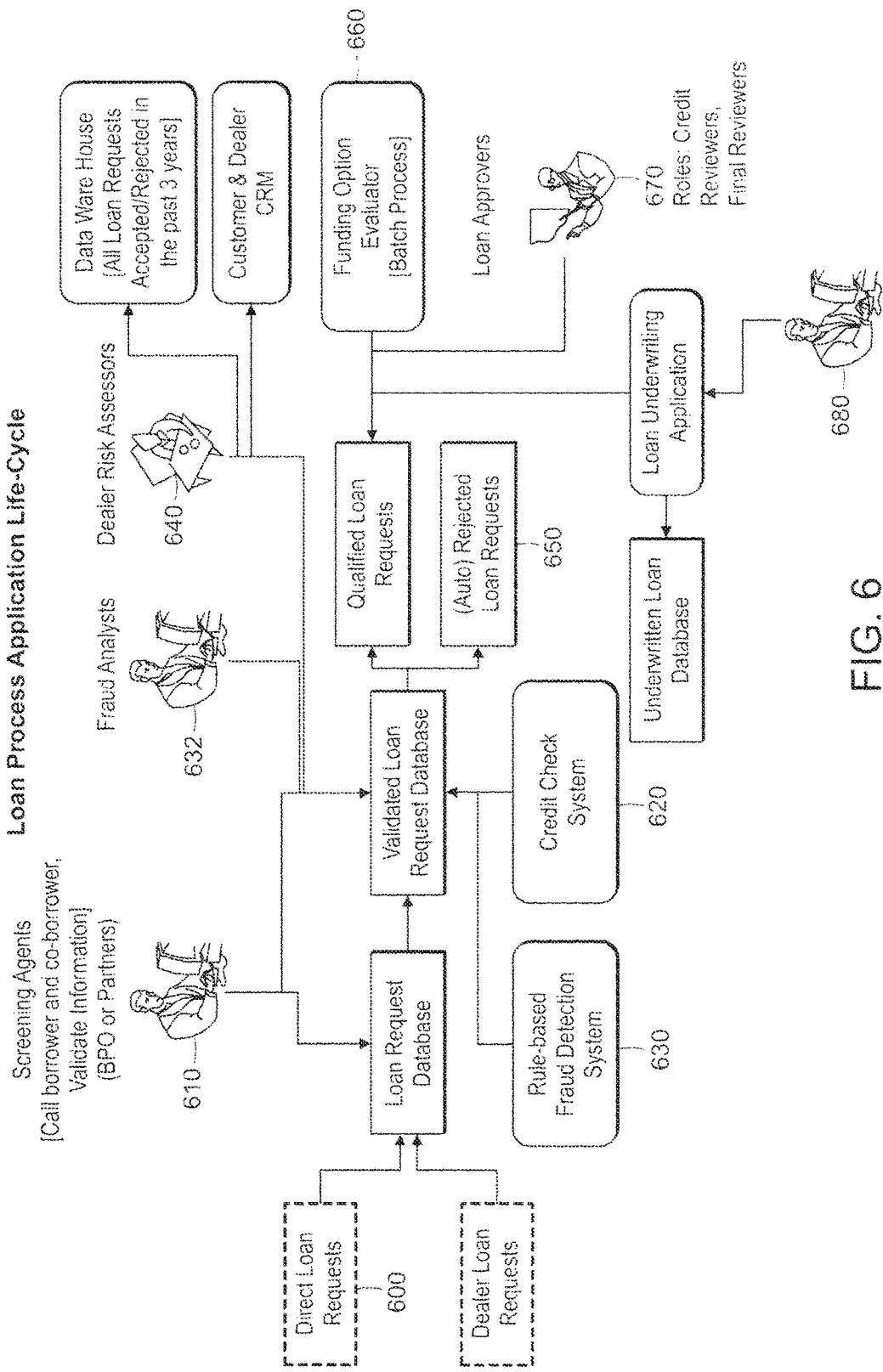
FIG. 6 shows the outline of a loan processing application life-cycle.

FIG. 4 shows an exemplary monitoring process that could be used to model the loan application system shown in FIG. 6. FIG. 5 shows an exemplary hybrid process that could be used to model the loan application system shown in FIG. 6. All the operations in the monitoring and hybrid processes may execute for each of the loan requests. At any point in time, to determine the status of a given loan, a system administrator may need to log in to multiple systems, in addition to understanding how to interpret data in light of how a loan is being processed. If an error or exception occurs while processing a loan, it may not be noticed until the status is checked manually. As such, loan exceptions are often not handled in a timely manner, let alone proactively, which can be frustrating to consumers. Modeling the loan application process with a monitoring process can alleviate these concerns and facilitate efficient business process management.

With a monitoring process, a model is created mapping all the operational process steps into various external human or system steps in the process. The following step references refer to FIGS. 4, 5 and 6, with the first numeral in each of the below referenced steps identifying the Figure in which the step appears. In step 610, loan requests are received directly from an applicant or on behalf of loan dealers. Human agents screen the loan requests and contact borrowers and co-borrowers to validate the loan information as accurate. When a new loan application is created in the loan processing application, a corresponding monitoring process instance is created in the RPM system. This is modeled by steps 402 or 502, which function identically. In step 620, a computer-automated credit check system performs credit checks for both the loan applicant, as well as any loan dealer that may be the source of the loan application. This is modeled by identical items 404 and 504. As the transactions in the application process execute, corresponding steps in the monitoring process automatically execute. In step 630, a computer rule-based fraud detection system performs an analysis on the loans in accordance with enterprise-defined policies. In step 632, a human fraud analyst reviews the loan if there is a policy trigger from the credit check system. These steps are modeled by Auto Risk Assessment worksteps 408 and 508. In steps 640 and 650, a dealer risk analysis is performed if considered necessary according to the enterprise defined policies, and the loan will be rejected if it is considered too risky to underwrite. Items 410 and 510 model this step. In step 660 qualified loans are processed by a computerized funding option evaluator to find an underwriter for the loan. This can be done either internally or externally. This is shown in items 414 and 514. The loan will be declined if there is no funding source, otherwise it is reviewed by loan approvers in step 670, which is modeled by steps 418 and 518. In step 680, approved loans are underwritten and consolidated into data warehouses.

With this modeling approach, business managers can have near real-time visibility into live loan processes and can view various real-time metrics, loan throughput, or potential bottlenecks, while monitoring the loan business operations. Based on how loans are processed, business managers can improve processes by extending the existing loan application process with regular process steps which will get executed by the BPM system.

Between steps 418/518 and 420/520 is where a difference can be seen between the monitoring process in FIG. 4 and the hybrid process in FIG. 5. In the hybrid process, illustrated in FIG. 5, exception handling occurs in step 524. Step 524 is a monitoring process step performed within the BPM system, in this example involving a human agent.

The business infrastructure platform and systems described herein can be implemented in software, which can be provided on a variety of computer readable media, including magnetic and optical disks, or a flash drive. The systems can be provided on one or more servers located at a single location or distributed across a network.

Although the present invention has been described and illustrated in the foregoing exemplary embodiments, it is understood that the present disclosure has been made only by way of example, and that numerous changes in the details of implementation of the invention may be made without departing from the spirit and scope of the invention. The invention is limited only by the claims that follow.

What is claimed is:

1. A responsive process management platform comprising:
   one or more processors;
   a business process management system:
   having an external monitoring process modeling a business process executed across a plurality of heterogeneous entities external to the business process management system, the plurality of heterogeneous entities working in conjunction with one another to complete portions of the business process, the business process having one or more worksteps traversed by a first instance and a second instance, the one or more worksteps including a workstep that is executed external to the business process management system and independent of one or more entities that execute the workstep so that the first instance and the second instance, at a same workstep, are executed differently and by a different set of one or more entities within the plurality of heterogeneous entities external to the business process management system, and
   making metrics describing a portion of the business process executing external to the business process management system visible in real-time to a user using the one or more processors, the portion of the business process visible in real-time to the user including the workstep that is executed external to the business process management system and independent of the one or more entities that execute the workstep;
   a business visibility system programmed to dynamically discover services deployed in an enterprise business services infrastructure using the one or more processors, the enterprise business service infrastructure including the plurality of heterogeneous entities external to the business process management system;
   a business events processing system programmed to analyze business events using the one or more processors;
   wherein one or more of (1) the business visibility system generates the first instance on which the business events processing system operates upon to drive an external modeling process and (2) the business events processing system-generates the second instance on which the business visibility system operates upon to drive the external modeling process; and
   wherein the business process management system is programmed to communicate with the business visibility system and with the business events processing system regarding the execution of worksteps through a standardized message format.

2. The responsive process management platform of claim 1, wherein the business visibility system is programmed to initiate in the business process management system the first instance and the second instance of the external monitoring process to model a process executing at least in part external to the business process management system.

3. The responsive process management platform of claim 2, wherein the business visibility system is further programmed to initiate an advance from a first workstep to a second workstep for one or more of the first instance and the second instance in response to sensing when the first workstep completes.

4. The responsive process management platform of claim 3, wherein the business visibility system is further programmed to provide a graphical user interface to permit configuration of a sensing event corresponding to completion of the first workstep.

5. The responsive process management platform of claim 1, wherein at least two of the business process management system, the business events processing system, and the business visibility system are further programmed to communicate with one another through the standardized message format in response to sensing when a first workstep completes.

6. The responsive process management platform of claim 1, wherein the business events processing system is programmed to obtain events external to the business process management system and events from the business visibility system.

7. The responsive process management platform of claim 6, wherein the business events processing system is programmed to identify from-the obtained events an event that initiates an instance of a monitoring process.

8. The responsive process management platform of claim 7, wherein the instance of the monitoring process corresponds to a process executing external to the business process management system.

9. The responsive process management platform of claim 8, wherein the business events processing system is further programmed to provide a graphical user interface to permit configuration of a sensing event corresponding to completion of a first workstep.

10. The responsive process management platform of claim 6, wherein the business events processing system is further programmed to identify from the obtained events an event that initiates an advance from a first workstep to a second workstep in an instance of a monitoring process.

11. The responsive process management platform of claim 1, wherein the business visibility system is programmed to extract and send data to the business process management system using the standardized message format.

12. The responsive process management platform of claim 1, wherein the business event processing system is programmed to extract and send data to the business process management system using the standardized message format.

13. The responsive process management platform of claim 1, wherein the business visibility system is programmed to send an alert to the business process management system signifying an exception condition using the standardized message format.

14. The responsive process management platform of claim 1, wherein the business event processing system is programmed to send an alert to the business process management system signifying an exception condition using the standardized message format.

15. The responsive process management platform of claim 1, wherein the standardized message format includes messages in accordance with a Java Message Service API.

16. The responsive process management platform of claim 1, wherein the standardized message format includes messages in accordance with a Web Services API.

17. The responsive process management platform of claim 1, wherein the first instance is executed by a first system external to the business process management system at the same workstep of the business process and the second instance is executed at least in part by the first system external to the business process management system and at least in part by a human at the same workstep of the business process, the first system external to the business process management system and the human comprising a second set of entities.

18. The responsive process management platform of claim 1, wherein the business visibility system discovers and monitors the enterprise business service infrastructure without modification of enterprise business infrastructure elements with code.

19. The responsive process management platform of claim 1, further comprising: modifying the business process based on an analysis of the portion of the business process executing in a system external to the business process management system visible in real-time to the user.

20. A business process management system comprising:
one or more processors;
an external monitoring process modeling a business process executed across a plurality of heterogeneous entities external to the business process management system, the plurality heterogeneous entities working in conjunction with one another to complete portions of the business process, the business process having one or more worksteps traversed by a first instance and a second instance, the one or more worksteps including a workstep that is executed external to the business process management system and independent of one or more entities that execute the workstep so that the first instance and the second instance, at a same workstep, are executed differently and by a different set of one or more entities within the plurality of heterogeneous entities external to the business process management system, and making a portion of the business process executing external to the business process management system visible in real-time to a user using the one or more processors, the portion visible in real-time to the user including the workstep that is executed external to the business process management system and independent of the one or more entities that execute the workstep; and
wherein the external monitoring process is programmed to communicate with a business visibility system and a business events processing system regarding the execution of worksteps through a standardized message format, wherein one or more of (1) the business visibility system generates the first instance on which the business events processing system operates upon to drive an external modeling process and (2) the business events processing system generates the second instance on which the business visibility system operates upon to drive the external modeling process.

21. The business process management system of claim 20, wherein the external monitoring process is further programmed to hold for in-order execution messages for sequential execution of worksteps received out of order.

22. The business process management system of claim 20, further comprising a graphical user interface having icons representing monitoring worksteps from external systems and from internal processes.

23. A responsive process management platform comprising:
one or more processors;
a business process management system having an external monitoring process modeling a business process executed across a plurality of heterogeneous entities external to the business process management system, the plurality of heterogeneous entities working in conjunction with one another to complete portions of the business process, the business process having one or more worksteps traversed by a first instance and a second instance, the one or more worksteps including a workstep that is executed external to the business process management system and independent of one or more entities that execute the workstep so that the first instance and the second instance, at a same workstep, are executed differently and by a different set of one or more entities within the plurality of heterogeneous entities external to the business process management system, and making metrics describing a portion of the business process executing external to the business process management system visible in real-time to a user using the one or more processors, the portion of the business process visible in real-time to the user including the workstep that is executed external to the business process management system and independent of the one or more entities that execute the workstep;
a business events processing system programmed to analyze business events and generate the first instance; and
wherein the business process management system is programmed to communicate with the business events processing system regarding the execution of worksteps through a standardized message format.

24. A responsive process management platform comprising:
one or more processors;
a business process management system having an external monitoring process modeling a business process executed across a plurality of heterogeneous entities external to the business process management system, the plurality of heterogeneous entities working in conjunction with one another to complete portions of the business process, the business process having one or more worksteps traversed by a first instance and a second instance, the one or more worksteps including a workstep that is executed external to the business process management system and independent of one or more entities that execute the workstep so that the first instance and the second instance, at a same workstep, are executed differently and by a different set of one or more entities within the plurality of heterogeneous entities external to the business process management system, and making metrics describing a portion of the business process executing external to the business process management system visible in real-time to a user using the one or more processors, the portion of the business process visible in real-time to the user including the workstep that is executed external to the business process management system and independent of the one or more entities that execute the workstep;
a business visibility system programmed to dynamically discover services deployed in an enterprise business services infrastructure and generate the first instance; and
wherein the business process management system is programmed to communicate with the business visibility system regarding the execution of worksteps through a standardized message format.

25. A responsive process management platform comprising:
one or more processors;
a business process management system having an external monitoring process modeling a business process executed across a plurality of heterogeneous entities external to the business process management system, the plurality of heterogeneous entities working in conjunction with one another to complete portions of the business process, the business process having one or more worksteps traversed by a first instance and a second instance, the one or more worksteps including a workstep that is executed external to the business process management system and independent of one or more entities that execute the workstep so that the first instance and the second instance, at a same workstep, are executed differently and by a different set of one or more entities within the plurality of heterogeneous entities external to the business process management system, and making metrics describing a portion of the business process executing external to the business process management system visible in real-time to a user using the one or more processors, the portion of the business process visible in real-time to the user including the workstep that is executed external to the business process management system and independent of the one or more entities that execute the workstep;
a business visibility system programmed to dynamically discover services deployed in an enterprise business services infrastructure using the one or more processors; and
wherein the business process management system and the business visibility system are programmed to use a standardized message format to permit the business visibility system to initiate at the business process management system an instance of the external monitoring process.

26. A responsive process management platform comprising:
one or more processors;
a business process management system having an external monitoring process modeling a business process executed across a plurality of heterogeneous entities external to the business process management system, the plurality of heterogeneous entities working in conjunction with one another to complete portions of the business process, the business process having one or more worksteps traversed by a first instance and a second instance, the one or more worksteps including a workstep that is executed external to the business process management system and independent of one or more entities that execute the workstep so that the first instance and the second instance, at a same workstep, are executed differently and by a different set of one or more entities within the plurality of heterogeneous entities external to the business process management system, and making metrics describing a portion of the business process executing external to the business process management system visible in real-time to a user using the one or more processors, the portion of the business process visible in real-time to the user including the workstep that is executed external to the business process management system and independent of the one or more entities that execute the workstep;

a business event processing system programmed to analyze business events using the one or more processors; and wherein the business process management system and the business event processing system are programmed to use a standardized message format to permit the business event processing system to initiate at the business process management system an instance of the external monitoring process.

* * * * *